United States Patent
Katoh

(10) Patent No.: US 6,779,044 B1
(45) Date of Patent: Aug. 17, 2004

(54) ACCESS CONTROL FOR AN INFORMATION PROCESSING DEVICE

(75) Inventor: Taku Katoh, Kamakura (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/387,770

(22) Filed: Sep. 1, 1999

(30) Foreign Application Priority Data

Nov. 13, 1998 (JP) .......................................... 10-323876

(51) Int. Cl.$^7$ .............................. G06F 3/00; H04L 9/00
(52) U.S. Cl. .............................. 710/5; 710/18; 713/160
(58) Field of Search ....................... 710/5, 18; 711/100; 713/200, 160; 709/245

(56) References Cited

U.S. PATENT DOCUMENTS

| | | | | |
|---|---|---|---|---|
| 5,291,596 A | * | 3/1994 | Mita .............................. 707/8 |
| 5,375,244 A | * | 12/1994 | McNair ..................... 710/200 |
| 5,586,235 A | * | 12/1996 | Kauffman ................... 707/500 |
| 5,694,472 A | * | 12/1997 | Johnson et al. ............... 380/25 |
| 5,796,092 A | * | 8/1998 | Nagata et al. ............... 235/492 |
| 5,805,800 A | * | 9/1998 | Kotani et al. ............... 713/200 |
| 5,949,877 A | * | 9/1999 | Traw et al. .................. 713/171 |
| 5,987,126 A | * | 11/1999 | Okuyama et al. ............... 380/5 |
| 5,987,524 A | * | 11/1999 | Yoshida et al. ............. 709/245 |
| 6,115,821 A | * | 9/2000 | Newby et al. .............. 713/200 |
| 6,128,740 A | * | 10/2000 | Curry et al. ................. 713/200 |
| 6,163,817 A | * | 12/2000 | Shteyn et al. ................... 710/8 |
| 6,169,879 B1 | * | 1/2001 | Perlman ..................... 455/6.2 |
| 6,223,285 B1 | * | 4/2001 | Komuro et al. ............. 713/160 |
| 6,298,196 B1 | * | 10/2001 | Shima et al. ................. 386/94 |
| 6,393,565 B1 | * | 5/2002 | Lockhart et al. ............ 713/172 |

* cited by examiner

*Primary Examiner*—Thomas Lee
*Assistant Examiner*—Chun Cao
(74) *Attorney, Agent, or Firm*—Finnegan, Henderson, Farabow, Garrett & Dunner, L.L.P.

(57) ABSTRACT

The invention relates to an information processing device with an access control function. This device comprises a first storage section storing at least one access information item that can be updated, a second storage section selectively storing at least one item of the access information, which was stored at least once in the past or is stored at present in the first storage section, a determination section for determining whether access by another information processing device is permissible or should be rejected, on the basis of the access information stored in the first or second storage section, and an access control section for controlling the another information processing device on the basis of the determination result of the determination section.

8 Claims, 13 Drawing Sheets

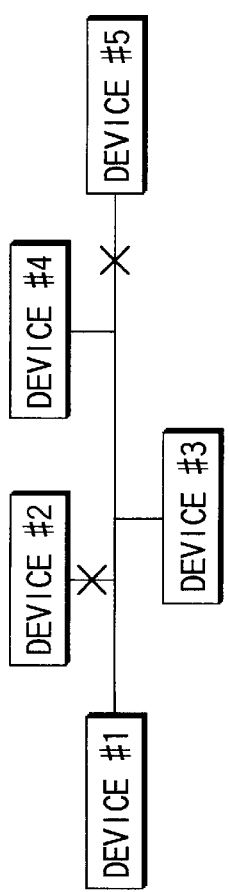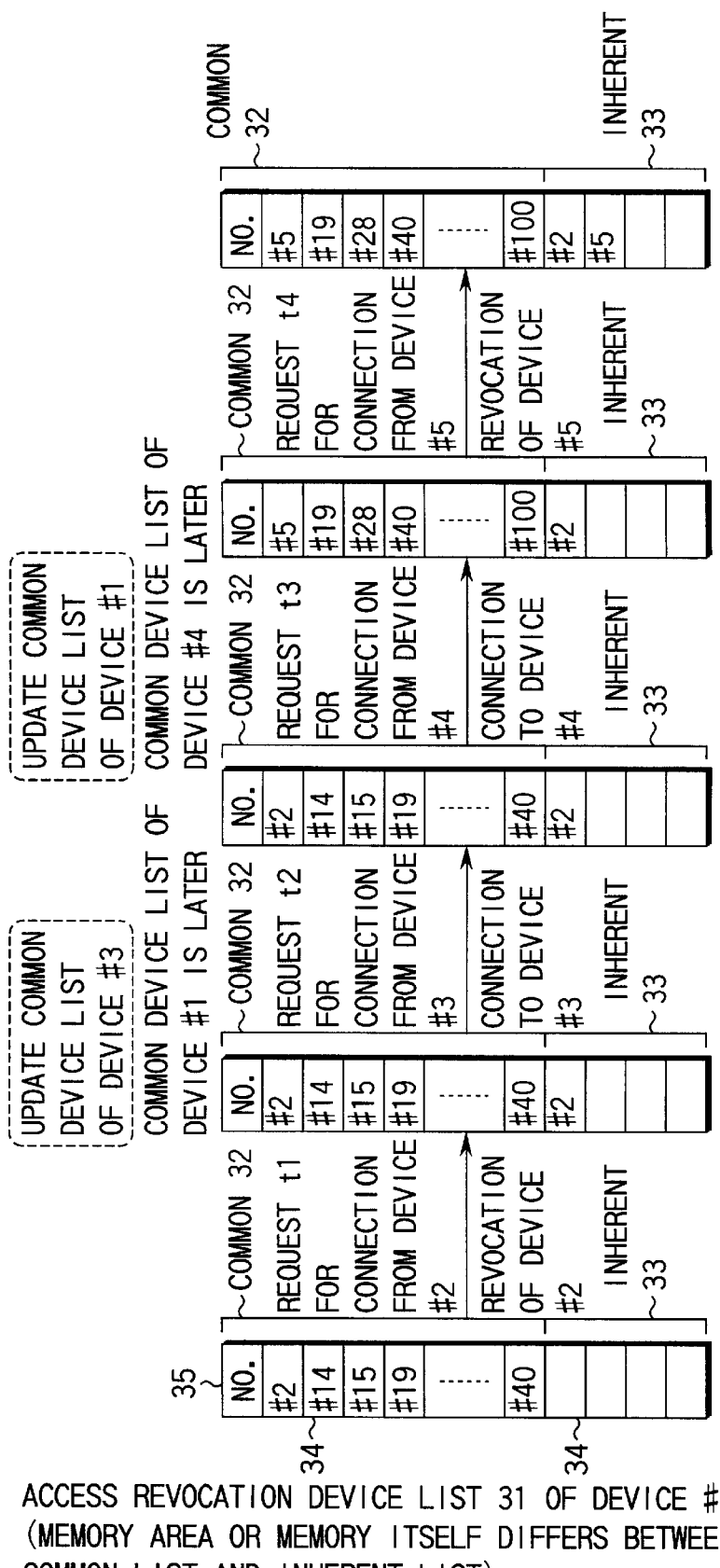
FIG. 5A
FIG. 5B
ACCESS REVOCATION DEVICE LIST 31 OF DEVICE #1 (MEMORY AREA OR MEMORY ITSELF DIFFERS BETWEEN COMMON LIST AND INHERENT LIST)

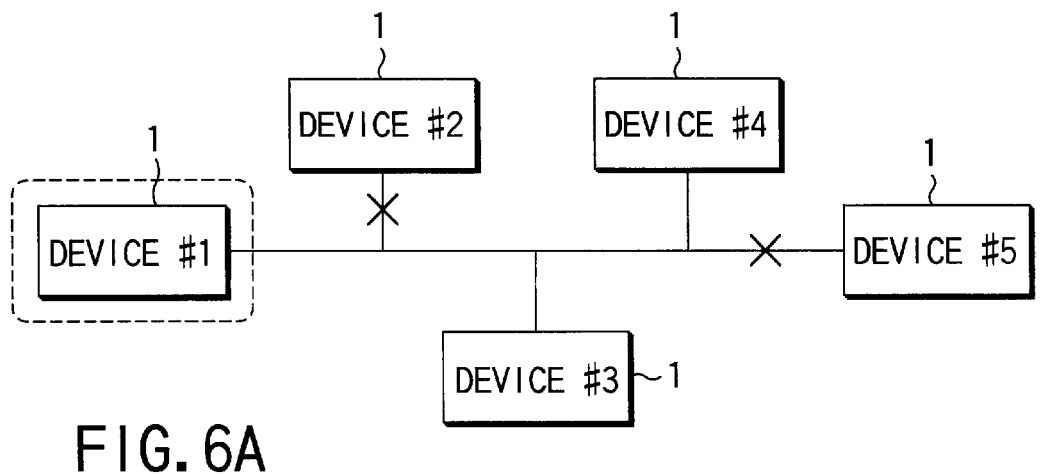
FIG. 6A
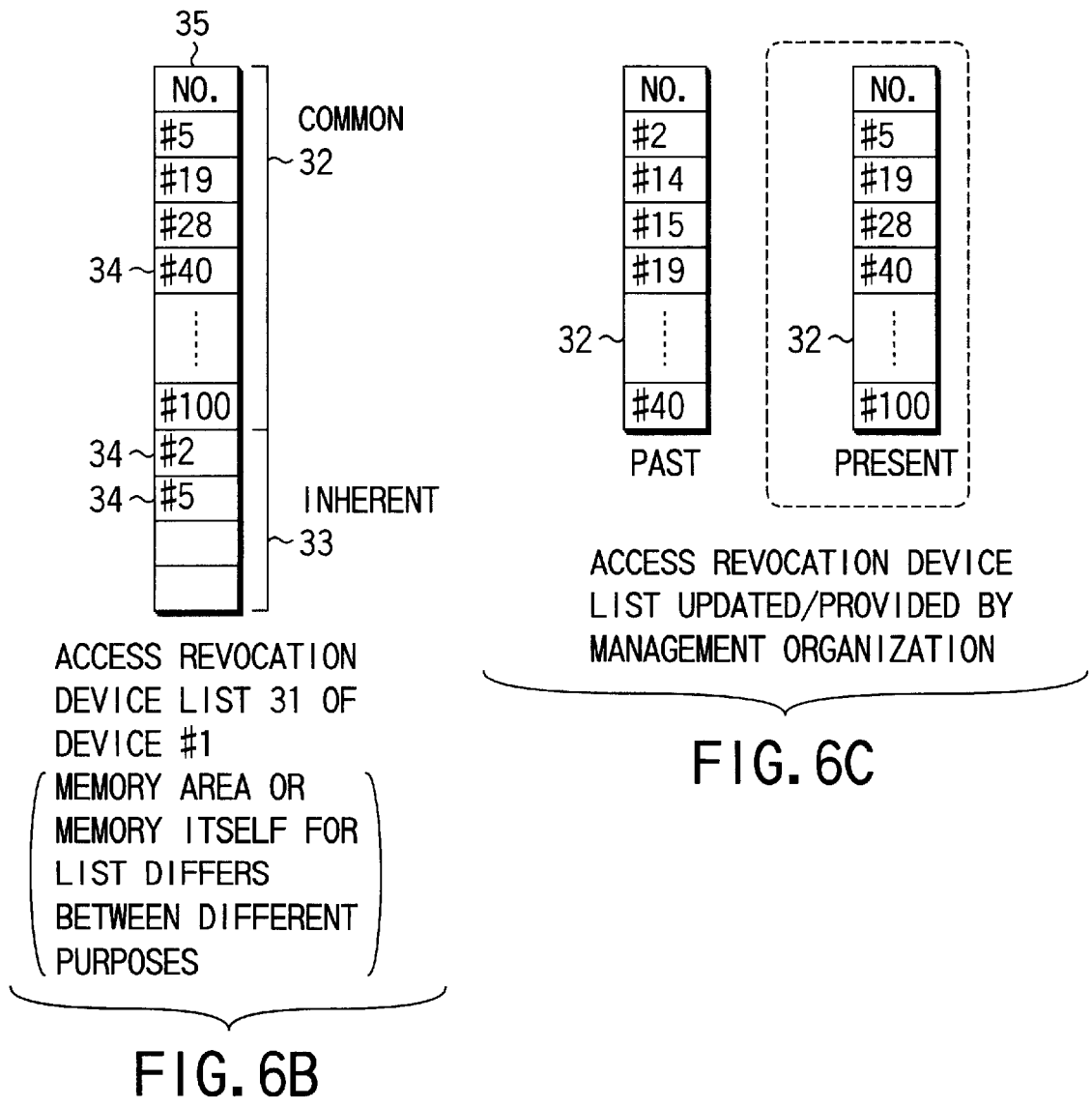

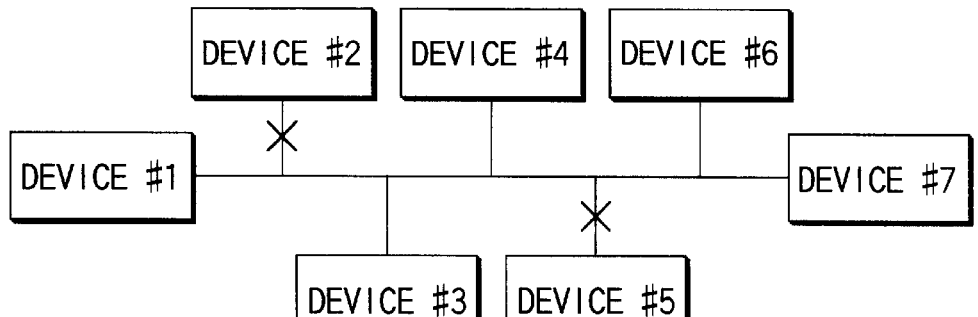
FIG. 11A
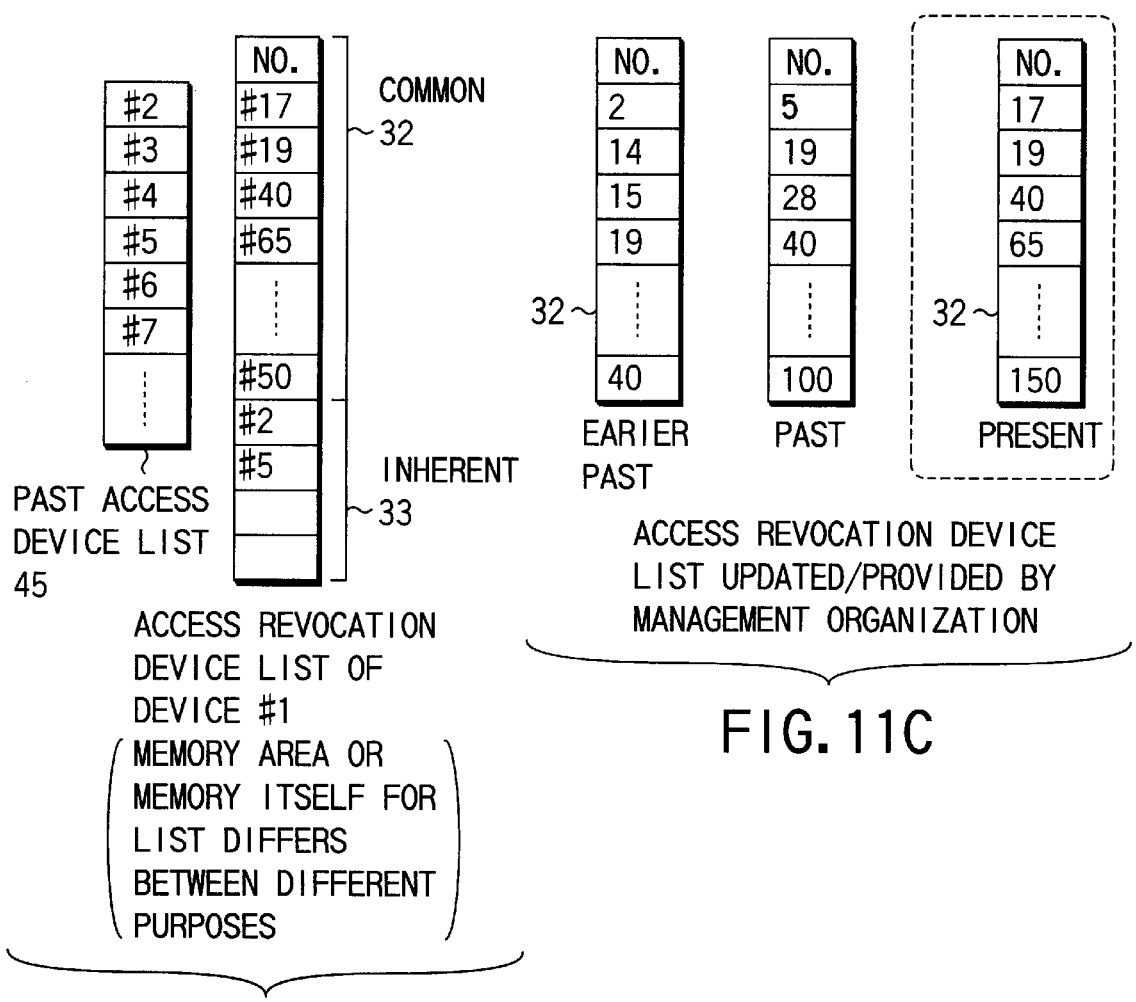
FIG. 11B
FIG. 11C

ACCESS CONTROL FOR AN INFORMATION PROCESSING DEVICE

BACKGROUND OF THE INVENTION

This invention relates to an information processing device having an access control function for performing control to determine whether access to or by another information processing device is permissible or should be rejected, in order to prevent unauthorized transfer of information. The invention also relates to its control program product and a storage medium for storing information necessary to operate the information processing device.

Digital information instruments such as DVD players, digital VTRs, etc. are being developed over the years, and therefore reproduction or recording of digital animation images can be easily realized at present. Moreover, a VOD (Video On Demand) system, for example, is now being developed for transmitting contents from a video server to an STB (Set Top Box) in accordance with a contract between the provider of the video server and the owner of the STB.

Since digital contents, unlike analog contents, are almost free from degradation in quality when recorded or reproduced, it is possible that original contents will be unauthoritatively copied, and a great amount of resultant unauthorized contents (so-called pirated editions) identical to the original ones will appear in the market. This being so, the owners of the copyright of the original contents may be very cautious in providing their digital contents, which will adversely affect the entire market of digital information instruments.

To avoid the above, information processing devices such as digital information instruments employ a mechanism for preventing unauthorized copying. However, it is possible that such an unauthorized copying prevention mechanism will be breached as a result of development of technology or intentionally breached by a person. In light of this, at present, unauthorized copying of digital contents is prevented by limiting access to or by the information processing devices when transferring information therebetween, as well as the employment of the unauthorized copying prevention mechanism.

For the access control, each information processing device holds an access revocation device list, as an aggregate of access control information, indicating devices which may perform unauthorized actions. When a certain information processing device has issued a request for access to another device, the latter device compares the identification number (ID) of the former device with the information in the list, and determines whether or not the former device is an access permissible one.

The above list can be created as follows.

A single access revocation device list for preventing any unauthorized access that can be expected is created and stored in an information medium which can be read by an information processing device (for example, if the information processing device is a CD-ROM drive, the information medium is a CD-ROM). This list is arranged to be always updated by the provider of the contents, and used to perform access control of all information processing devices.

There is another method, in which a plurality of lists that individually contain access control information items corresponding to respective information processing devices are prepared to constitute, as a whole, an access revocation device list. This list is transmitted in the form of data which can be read by respective devices (if one of the devices is a receiver for receiving a broadcast, the list is transmitted in the form of an electric wave), which enables updating of access control information in each device. This is contrived in consideration of the state, the environment, etc. in which each information processing device is used.

In the first-mentioned method, even a great amount of data can be easily updated. However, access control information cannot be updated for each information processing device.

In light of the above, it is necessary, for all digital devices produced so far and all devices whose unauthorized copying prevention mechanisms are breached, to include, in the objects be subjected to access limitation, information processing devices capable of performing unauthorized operations. Accordingly, the access revocation device list inevitably contains a great amount of information. If the size of the information in the list is limited, it is possible that all necessary access control information will not be stored therein.

On the other hand, in the second-mentioned method, the state of correspondence between information processing devices or the environment, district, etc., in which each device is used, can be taken into consideration. Accordingly, a large-scale list is not necessary for each information processing device, as compared with the first-mentioned method. Since, however, it is necessary to prepare a list for each information processing device, the entire access revocation device list will inevitably become large. If the entire amount of information is limited, only a small amount of access control information must be imparted to each list.

So far as the information processing capacity or storage capacity of each information processing device is limited, the contents of the access control information stored in the access revocation device list must be changed in accordance with the development of new type information processing devices or of techniques for breaching the protection mechanism, irrespective of using the first-mentioned method or the second-mentioned method.

However, there are many cases where the environment in which each information processing device is used, i.e. the relationship between each device and other devices which may access the former, will not change for a long time. In particular, in the case of a personal information processing device (an audio system, a personal computer, etc.), the once set system will not always be exchanged for a new one so quickly. It is also possible that the use of old type devices will continue even after they have stopped being manufactured. On the other hand, it is very possible that the aforementioned relationship will change in the near future.

Accordingly, it is possible that the above-described access control methods will not realize appropriate access control as a result of changes in the access revocation device list or the environment in which the information processing device is used.

Furthermore, the above-described problems in access control may occur where a computer network system, a VOD system, or any other type of information processing devices are connected to each other, in addition to so-called digital information devices such as a DVD recorder/player, a CD-ROM drive, etc. as aforementioned.

BRIEF SUMMARY OF THE INVENTION

It is an object of the invention to provide an information processing device with an access control function, its control program product and a recording medium, which can continue to reject access by a wrong device that may be used at present and in the future, and can update the contents of an access revocation device list.

It is another object of the invention to provide an information processing device with an access control function, its control program product and a recording medium, which can continue to permit access by a correct device that may access it at present and in the future, and can update the contents of an access permission device list.

According to a first aspect of the invention, there is provided an information processing device with an access control function comprising: a first storage section storing at least one access information item that can be updated; a second storage section selectively storing at least one item of the access information, which was stored at least once in the past or is stored at present in the first storage section; a determination section for determining whether access by another information processing device is permissible or should be rejected, on the basis of the access information stored in the first or second storage section; and an access control section for controlling the another information processing device on the basis of a determination result of the determination section.

Preferably, the information processing device according to the first aspect further comprises: a past-accessed object storage section storing, irrespective of a determination result of the determination section, identification information indicating another information processing device access to which or access by which was requested; and an access information adding section for additionally registering, in the second storage section, the access information stored in the first storage section when an accessed object indicated by the identification information stored in the past-accessed object storage section is identical to an accessed object indicated by the access information stored in the first storage section.

According to a second aspect of the invention, there is provided a computer program stored in a computer readable medium, comprising: a code of first storage control means for storing, in a first storage section, at least one access information item that can be updated; a code of second storage control means for selectively storing, in a second storage section, at least one item of the access information, which was stored at least once in the past or is stored at present in the first storage section; a code of determination means for determining whether access by another information processing device is permissible or should be rejected, on the basis of the access information stored in the first or second storage section; and a code of access control means for controlling the another information processing device on the basis of a determination result of the determination section.

According to a third aspect of the invention, there is provided a recording medium that stores information used to determine whether an information processing device can access or cannot access another information processing device, comprising: a first storage section storing a list that includes at least one access information item used to determine whether an information processing device can access or cannot access another information processing device; and a second storage section storing at least one item of the access information, which was included in the list in the past or is included in the list at present.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5A is a view showing an example of a system structure in which access control is executed;

FIG. 5B is a view showing an example of a state in which the contents of an access revocation device list are changed when the access control is executed;

FIG. 6A is a view of a system structure, useful in explaining that any device rejected once in the past is rejected even when the contents of a common access revocation device list have been changed;

FIG. 6B is a view of an example of an access common access revocation device list, useful in explaining that any device rejected once in the past is rejected even when the contents of a common access revocation device list have been changed;

FIG. 6C is a view of an example of a common access revocation device list, useful in explaining that any device rejected once in the past is rejected even when the contents of the common access revocation device list have been changed;

FIG. 11A is a view of a system structure, useful in explaining that any device registered in an inherent access revocation device list is rejected even when the contents of the common access revocation device list have been changed;

FIG. 11B is a view of examples of an access common access revocation device list and a past accessed device list, useful in explaining that any device once registered in the inherent access revocation device list even when the contents of the common access revocation device list have been changed;

FIG. 11C is a view of an example of an access revocation device list, useful in explaining that any device once registered in the inherent access revocation device list even when the contents of the common access revocation device list have been changed;

DETAILED DESCRIPTION OF THE INVENTION

The present invention employs common access information to be able to be updated for a plurality of information processing devices, and access information inherent to each information processing device, and is arranged to make a common updating section take charge of, for example, acquisition of latest access information, and also to make an inherent section take charge of an environment in use inherent to each information processing device. This structure enables realization of effective access control using limited memory sources.

FIRST EMBODIMENT

A description will be given of a method for rejecting access by a device (information processing device) which was a clean or correct device but has malfunctioned or has been intentionally or unintentionally made to perform erroneous operations by an offensive person (such a device will hereinafter be referred to as a "wrong device").

Further, the information used as access control information in the present invention indicates the number of a device considered wrong (a number peculiar to the device, e.g. a manufacture number; this number will also be referred to simply as "ID information or number"). Devices put on access revocation device lists that contain access control information are wrong ones. The one of the access revocation device lists which is common to each device included in the entire system, i.e. a common access revocation device list, has its contents created by the management organization of the system and updated when necessary. This common list is transmitted to each information processing device via a recording medium such as a DVD or via a broadcast.

Figure 1A:
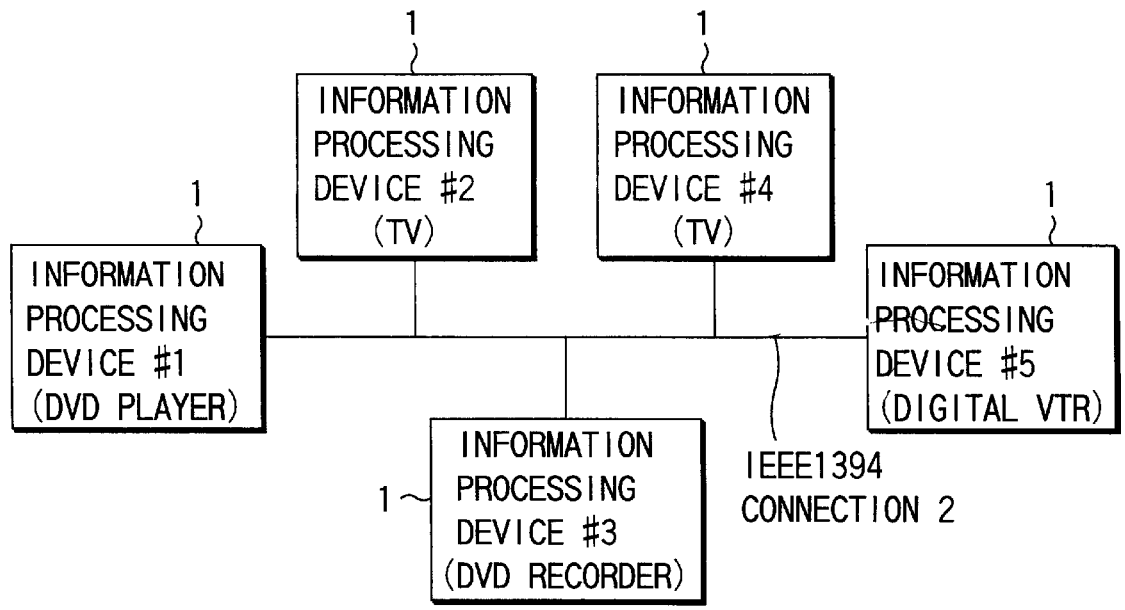
FIG. 1A is a block diagram illustrating an example of an information system in which information processing devices according to a first embodiment of the invention are connected to each other.

FIG. 1A shows an example of the information system in which an information processing device according to a first embodiment of the invention is connected.

This information system comprises five information processing devices 1 (#1–#5) as digital information devices connected to each other by a cable 2 (in the case of the figure, the cable is an IEEE1394 cable). In this case, the information processing device 1 (#1) is a DVD player, the information processing device 1 (#2) is a television, the information processing device 1 (#3) is a DVD recorder, the information processing device 1 (#4) is a second television, and the information processing device 1 (#5) is a digital VTR.

Hereinafter, each information processing device 1 shown in FIG. 1A will be sometimes referred to simply as a "device 1" as in FIG. 1B.

Figure 2:
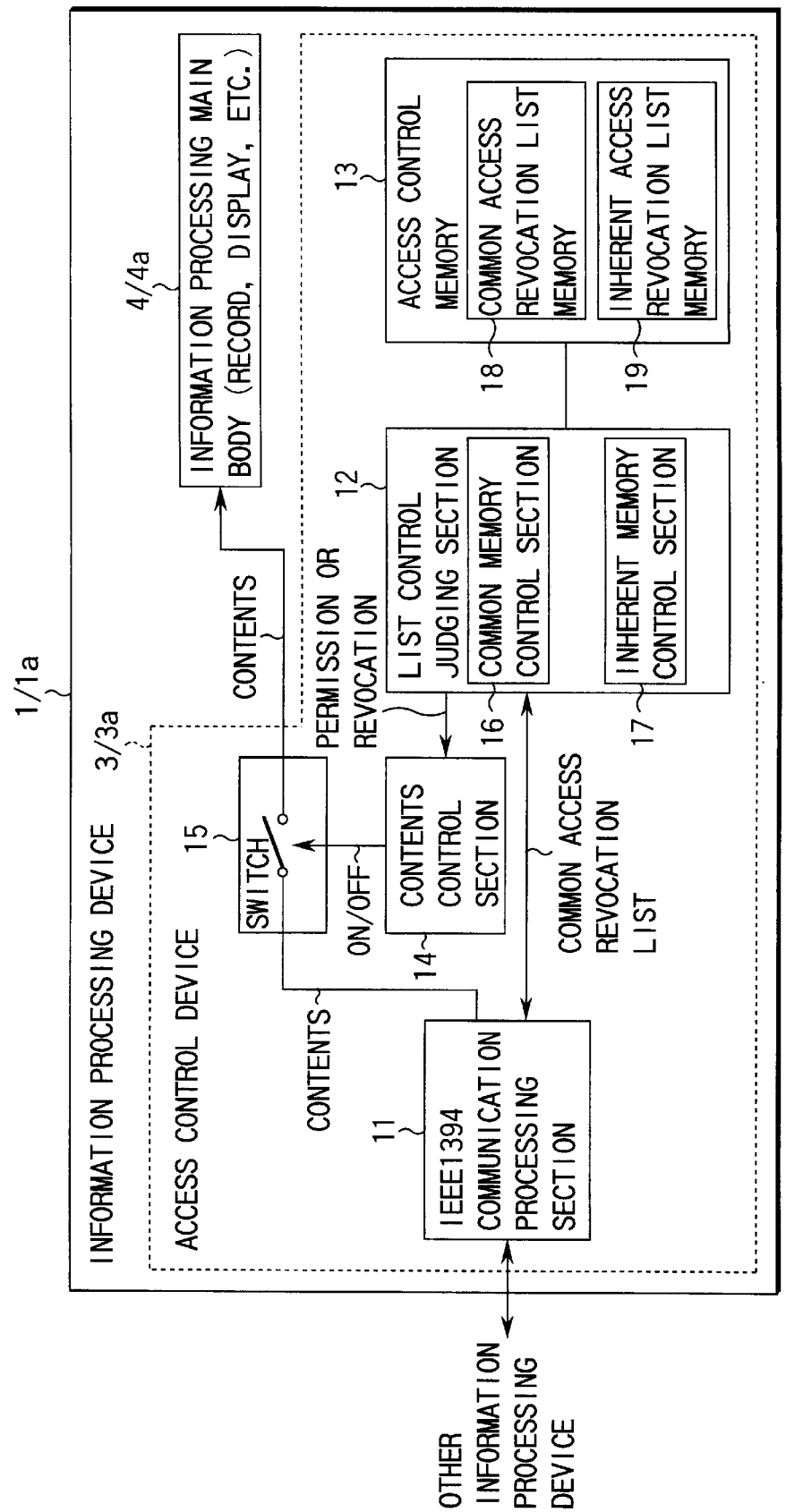
FIG. 2 is a block diagram showing an example of a structure assumed when the information processing device of the invention is used as a contents receiving device.

FIG. 2 is a block diagram showing an example of a structure of the information processing device according to the embodiment, assumed when it is used as a contents receiving device.

The information processing device 1 comprises an access control unit 3 for executing access control and performing communication with other IEEE1394 devices (other information processing devices 1), and an information processing main section 4 as a main section for performing main information processing of the device.

Further, as shown in FIG. 2, in an information processing device 1a used as a contents receiving device, an information processing main section 4a is adapted to record or display received digital contents. In other words, the information processing device 1a is a television or a DVD decoder.

The access control unit 3a used as a contents receiving unit is formed of an IEEE1394 communication processing section 11, a list control/determination section 12/12a, an access control memory 13, a contents control section 14 and a switch section 15. The functions of these sections 11–15 are realized using calculation elements such as a CPU, memory means, etc., and their control programs and data.

The IEEE1394 communication processing section 11 transmits and receives digital contents to and from other information processing devices in accordance with the IEEE1394 standards. Further, when communicating with another information processing device, the processing section 11 receives its own common access revocation list from the list control/determination section 12 and transmits it to the other information processing device, and also receives a common access revocation list from the other information processing device and transfers it to the list control/determination section 12.

The list control/determination section 12 has a common memory control section 16 and an inherent memory control section 17, and is adapted to operate the contents of the common access revocation device list and the inherent access revocation device list stored in the access control memory 13. The section 12 is also adapted to decide, on the basis of the contents of each list, whether access by another information processing device 1, with which communication is performed, is permissible or should be rejected, thereby informing the contents control section 14 of the decision.

The common memory control section 16 is adapted to compare serial number information items with each other, which are respectively put, as new/old information, on the common access revocation device list supplied from the outside of the device 1 and the common access revocation device list stored in the access control memory 13, thereby always updating the contents of the access control memory 13 by replacing them with the common access revocation device list having the latest serial number information. The new/old information of the list may be, for example, date information.

The inherent memory control section 17 treats, as an inherent object for the present information processing device, access by which should be rejected, another information processing device put on the latest common access revocation device list and issuing a request for access. Access control information corresponding to the device treated as the object is added to the inherent access revocation device list.

The access control memory 13 includes a common access revocation list memory 18 and an inherent access revocation list memory 19 for storing the common access revocation device list and the inherent access revocation device list, respectively. The common access revocation device list is a list that can be used in common between the information processing devices included in the information system, and includes new/old information and ID information concerning information processing devices access by which should be rejected. On the other hand, each inherent access revocation device list is a list concerning ID information on information processing devices access by which should be rejected, and is imparted to a corresponding information processing device only. In the drawings and the description, reference numerals #1, #2, #3, . . . will be used in place of specific ID information.

The contents control section 14 is adapted to supply the switch section 15 with an instruction to "connect" upon receiving information indicative of access permission from the list control/determination section 12, and to supply the switch section 15 with an instruction to "disconnect" upon receiving information indicative of access revocation from the section 12.

Upon receiving the instruction to "connect", the switch section 15 supplies the information processing main section 4a with contents transmitted from another information processing device and received by the communication processing section 11. On the other hand, upon receiving the instruction to "disconnect", the switch section 15 switches off the connection so as not to supply the information processing main section 4a with the contents.

Figure 3:
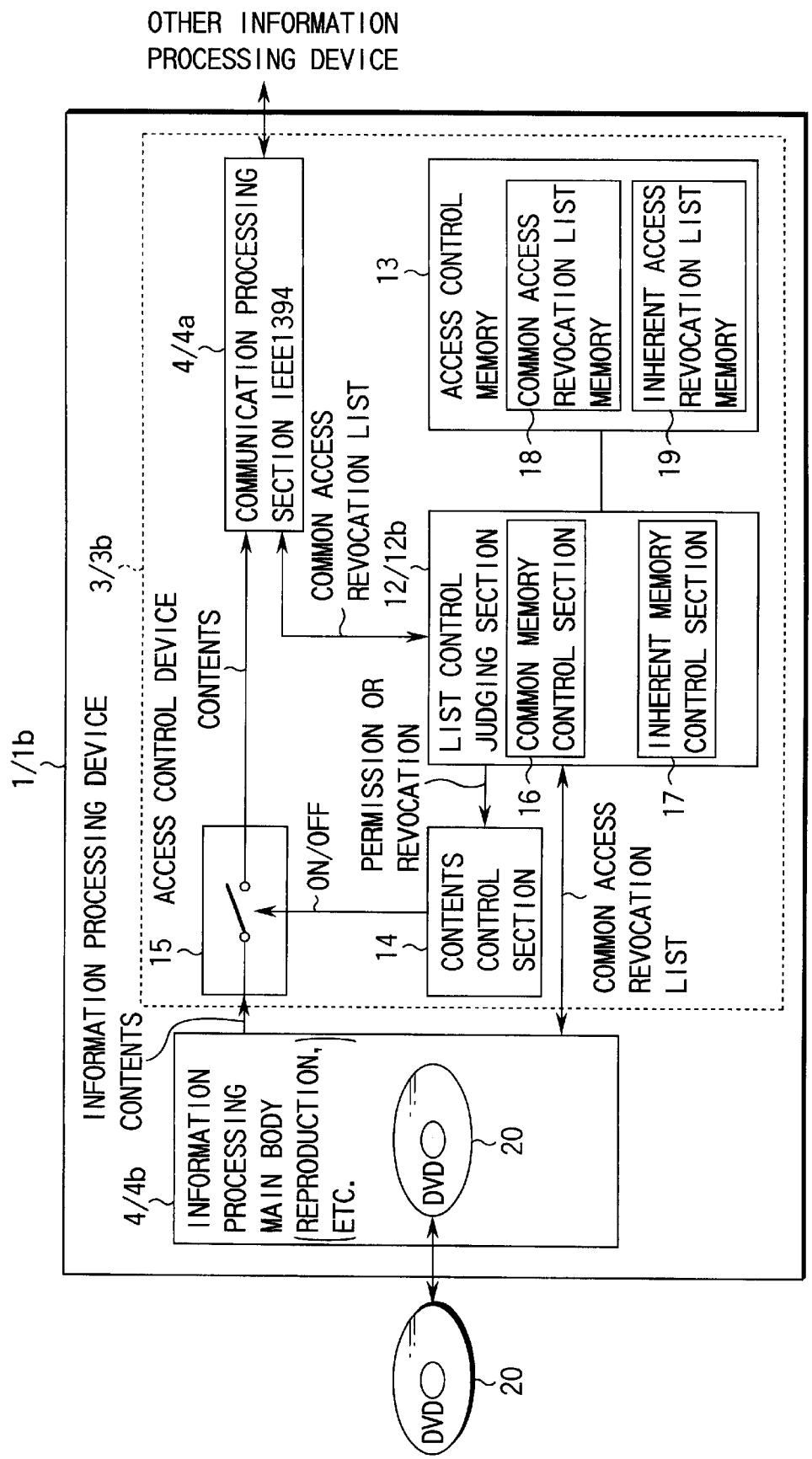
FIG. 3 is a block diagram illustrating an example of a structure assumed when the information processing device of the invention is used as a contents transmitting device.

FIG. 3 is block diagram illustrating an example of a structure of the information processing device according to the embodiment, assumed when it is used as a contents transmitting device. In FIG. 3, elements similar to those in FIG. 2 are denoted by corresponding reference numerals, and no description will be given thereof.

When using an information processing device 1b as a contents transmitting device, an information processing main section 4b, for example, reproduces contents from a recording medium 20 and transmits them to anther information processing device 1. The recording medium 20 may be detachable or undetachable.

Where the recording medium 20 consists of a detachable medium such as a DVD disk, a CD disk, a CD-ROM disk, etc., it stores a common access revocation device list which is latest when it is manufactured. When the information processing main section 4b reproduces information, the common access revocation device list is read before it is reproduced, and is transferred to the list control/determination section 12b.

An access control unit 3b has a structure similar to the access control unit 3a except that the function of the list control/determination section 12/12b is modified and the transmission direction of contents at the switch section 15 is opposite.

Although each control section 16 or 17 in the list control/determination section 12b has the same function as that in the list control/determination section 12a, a function for determining whether access permission or revocation should be performed is modified.

Specifically, to reproduce the contents of the recording medium 20 and transmit them to another information processing device 1, the list control/determination section 12b first receives the common access revocation device list stored in the recording medium, and then controls the common memory control section 16 so as to update the contents of the common access revocation list memory 18. After that, the communication processing section 11 accesses said another information processing device 1, thereby determining, using the updated common access revocation device list, whether access permission or revocation should be performed.

In the case of a device that performs both transmission and reception of contents, it has functions corresponding to both the functions of the above-described information processing devices 1a and 1b.

The operation of the information processing device constructed as above will now be described.

Figure 4:
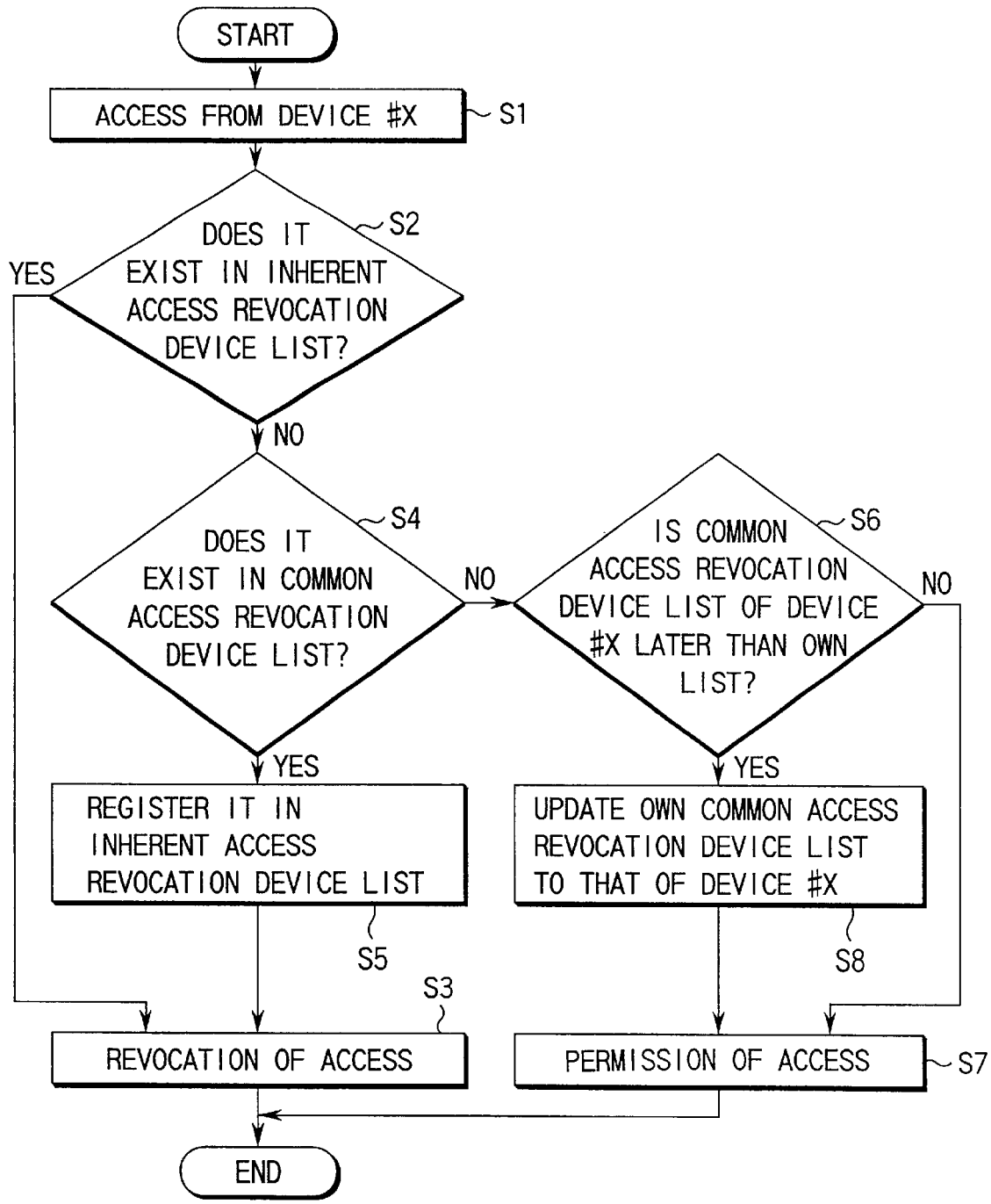
FIG. 4 is a flowchart useful in explaining processing performed between two information processing devices when a request for connection has been issued from one of the devices to the other or vice versa, until access by the one or by the other is permitted or rejected.

FIG. 4 is a flowchart illustrating the procedure of processing performed to execute access permission or revocation between an information processing device according to the embodiment and another information processing device that has requested or has been requested to be connected to the first-mentioned device.

When a request for connection has been issued from a certain device #X (step S1), the IEEE1394 communication processing section 11 performs predetermined response processing, and supplies the list control/determination section 12 with identification information on the device #X and a received common access revocation device list. At this time, access to the device #X is not yet permitted.

Then, the inherent memory control section 17 reads the inherent access revocation device list from the memory 19, thereby confirming whether or not the identification information on the device #X exists in the inherent access revocation device list (step S2).

If the identification information on the device #X exists in the inherent access revocation device list (step S2), access by the device is rejected (step S3). At this time, an access rejection signal is supplied from the list control/determination section 12 to the contents control section 14, which in turn switches of the switch section 15. As a result, the contents from the device #X are not transmitted to the information processing main section 4.

If, on the other hand, the identification information on the device #X does not exist in the inherent access revocation device list (step S2), the common memory control section 16 reads the common access revocation device list from the memory 18, thereby determining whether or not the identification information on the device #X exists in the common access revocation device list (step S4).

If the identification information on the device #X exists in the common access revocation device list (step S4), it is considered access control information indicating that the device #X should be rejected, and is registered in the inherent access revocation device list by the inherent memory control section 17 (step S5). Then, access by the device #X is rejected (step S3).

If the identification information on the device #X does not exist in the common access revocation device list (step S4), the common access revocation device list read from the memory 18 is compared with the common access revocation device list of the device #X, thereby determining which list is the latest one (step S6).

If the former list is the latest one, access by the device #X is permitted (step S7). The contents control section 14 is formed of "permission" and hence switches on the switch section 15, thereby transmitting the contents from the device #X to the information processing main section 4.

If the common access revocation device list of the device #X is determined to be the latest one at the step S6, the common memory control section 16 replaces the list of the common access revocation list memory 18 with that of the device #X (step S8), thereby permitting access by the device #X (step S7).

The above-described operation is performed by the information processing device 1a as contents receiving device. In the case of the information processing device 1b as contents transmitting device, the following processing is added to the above.

Where the information processing main section 4b is a reproducing device for the recording medium 20, the common access revocation device list is reproduced before the reproduction of contents, and transmitted to the list control/determination section 12b (FIG. 3).

The common access revocation device list stored in the recording medium 20 is compared with that stored in the common access revocation list memory 18, using respective new/old information items. When the list of the recording medium 20 is the latest one, the contents of the memory 18 is replaces with the latest list.

After the above-described series of processing, the IEEE1394 communication processing section 11 starts to access the device #X (information processing device) (step S1 of FIG. 4), thereby acquiring the identification information and the common access revocation device list of the device #X and executing processing similar to that performed at the steps S2–S8.

Further in the case of the information processing device 1b as the contents transmission device, transmission of the contents, reproduced by the information processing main section 4b, to the device #X via the switch section 15 is permitted or rejected at each of the steps S3 and S7, which means that the direction in which the contents flow is opposite.

Referring then to FIGS. 5A and 5B, a specific processing case will be described.

FIG. 5B shows an example of a state in which the contents of the access revocation device list change while the access control is executed.

Figure 1B:
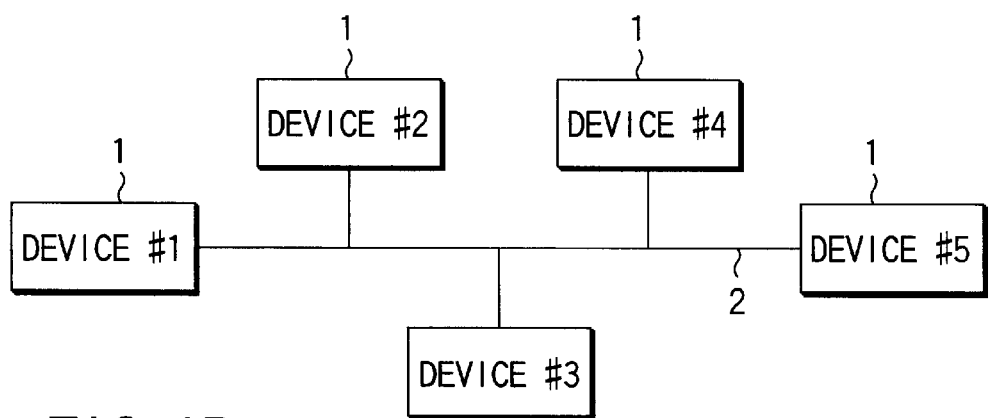
FIG. 1B is a view roughly showing the system of FIG. 1A.

FIG. 5A shows the same connection state of the information processing devices as that of FIG. 1B. Further, FIG. 5B shows changes in the access revocation device list 31 of the device #X.

The access revocation device list 31 includes a common access revocation device list 32 and an inherent access revocation device list 33 as described above. Each list stores identification information (#2, #14, . . . ) as access control information 34. The common access revocation device list 31 stores new/old information 35.

The access control performed in a device #1 will be described with reference to FIG. 5B.

When the device #1 has received a request (t1) for connection from a device #2 that is registered in the common access revocation device list of the device #1, it registers the identification information of the device #2 in the inherent access revocation device list 33 in accordance with the processing described with reference to FIG. 4 and rejects access by the device #2. It should be noted that at the initial stage such as shipping of devices, no access information is registered in the inherent access revocation device list 33.

When the device #1 has received a request (t2) for connection from a device #3 whose identification information is not on the common or inherent access revocation device list, it permits access by the device #3. Further, the new/old information items 35 of the devices #1 and #3 are compared with each other. Since in this case, the common access revocation device list 32 of device #1 is the latest one, it is not updated.

When the device #1 has received a request (t3) for connection from a device #4 whose identification information is not on the access revocation device list 31, and whose common access revocation device list 32 is the latest one, the common access revocation device list 32 of the device #1 is replaced with the latest one, and then access by the device #4 is permitted.

When the device #1 has received a request (t4) for connection from a device #5 that is registered in the access revocation device list 31 of the device #1, identification information on the device #5 is registered in the inherent access revocation device list 33 of the device #1, and then access by the device #5 is rejected.

If there is a request for connection from the device #2 again, access to it is rejected since its identification information does not exist in the common access revocation device list 32 but exists in the inherent access revocation device list 33.

FIGS. 6A, 6B and 6C are views useful in explaining a case in which any device once rejected in the past is rejected even if the contents of the common access revocation device list change. FIG. 6A is similar to FIG. 5A, FIG. 6B shows the latest access revocation device list in FIG. 5B, and FIG. 6C shows changes in the common access revocation device list 32 in this case.

As is shown in these figures, introduction of the inherent access revocation device list 33 causes different information processing devices to have different inherent access revocation device lists 33. When access control information 34 has been once added in the inherent access revocation device list 33 in accordance with a change in the connection environment of the information processing device 1, it will not be erased.

Accordingly, different from the case of using only the common access revocation device list 32, flexible access control corresponding to the network environment of each device can be performed using a corresponding inherent access revocation device list 33 that registers once rejected devices. In other words, irrespective of changes in the common access revocation device list 32, a request for access from any wrong device registered in the inherent access revocation device list is rejected.

Figure 7A:
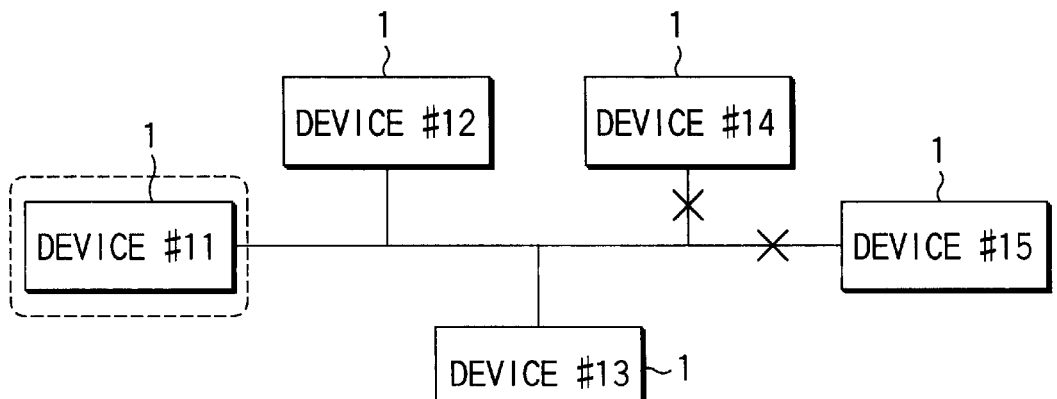
FIG. 7A is a view of another system structure, useful in explaining that any device rejected once in the past is rejected even when the contents of the common access revocation device list have been changed.
Figure 7B:
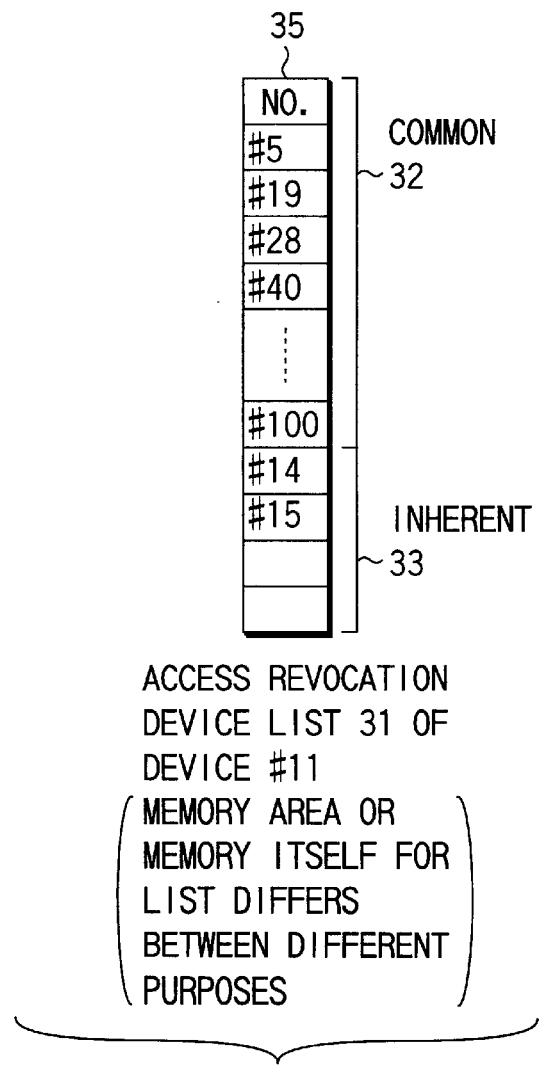
FIG. 7B is a view of another example of the access common access revocation device list, useful in explaining that any device rejected once in the past is rejected even when the contents of a common access revocation device list have been changed.

FIGS. 7A and 7B show another case where any device once rejected in the past is rejected even if the contents of the common access revocation device list change.

In the FIG. 7B case, devices #14 and #15 were rejected in the past, which is reflected on the inherent access revocation device list 33. This access control information is not included in the present common access revocation device list 32.

The contents of the common access revocation device list 32 of each device are replaced not only with information directly supplied from the management organization, but also with the contents of the common access revocation device list 32 stored in a correct information processing device and more recent than those of the common list of said each device. Accordingly, if it is necessary to strongly show the correctness of a to-be-transmitted common access revocation device list 32, a technique such as digital signature can be used.

As described above, in the information processing device according to the embodiment, the access revocation list includes the common access revocation device list 32 and the inherent access revocation device list 33, and the common access revocation device list is automatically updated by comparing new and old information items with each other. This being so, access by any wrong device that may be used now and in future can be kept rejected, and the contents of the access revocation device list can be always updated. As a result, the latest information on wrong devices can be always acquired by updating the contents of the common access revocation device list 32, and access by a device can be rejected using the inherent access revocation device list 33, even if it is erased from the latest common access revocation device list 32. In other words, access by any device once rejected can be rejected now and in future irrespective of whether or not a common portion of access information changes.

In other words, in the invention, access control information recorded even temporarily in the information processing device 1 is divided into access control information which was used and may be used in future, and access control information which is not actually being used. Even if the access control information which may be used in future is not included in updated information, information updating is performed, with access control information maintained which is already registered in the device and may be used in future. As a result, only information, which is included in the access control information in each device 1 and has a low possibility of use, is replaced with new one, whereby the access control information can be kept most appropriately for the environment of use of each information processing device 1 and can be efficiently updated.

Moreover, each information processing device 1 has a function (using the common and inherent lists 32 and 33) for discriminating access control information stored therein in accordance with the frequency of use, the degree of usefulness, etc., which means that when the device 1 has received the latest information and updates the access control information using the latest information, it updates information items in the order beginning from the one with the lowest frequency of use or the lowest usefulness. Therefore, the access control information can be managed accurately in accordance with the circumstances under which each information processing device is situated, and with the intention of a latest-information provider.

In addition, updating of the common access revocation device list 32 can be limited by, for example, a digital signature. Therefore, where, for example, a plurality of latest-information providers exist, the intention of each information provider can be strongly reflected by giving priority to updating of access control information which each information provider strongly wants to update. In other words, each information processing device can update access control information items in the order beginning from an item whose updating is most strongly desired by the latest-information provider, by giving a priority order to the latest information items.

SECOND EMBODIMENT

In the second embodiment, each information processing device uses, as well as the lists employed in the first embodiment, a list that stores identification information indicating a device number assigned to a device which was once connected thereto, in order to reject access by a wrong device which may be connected in future.

Figure 8:
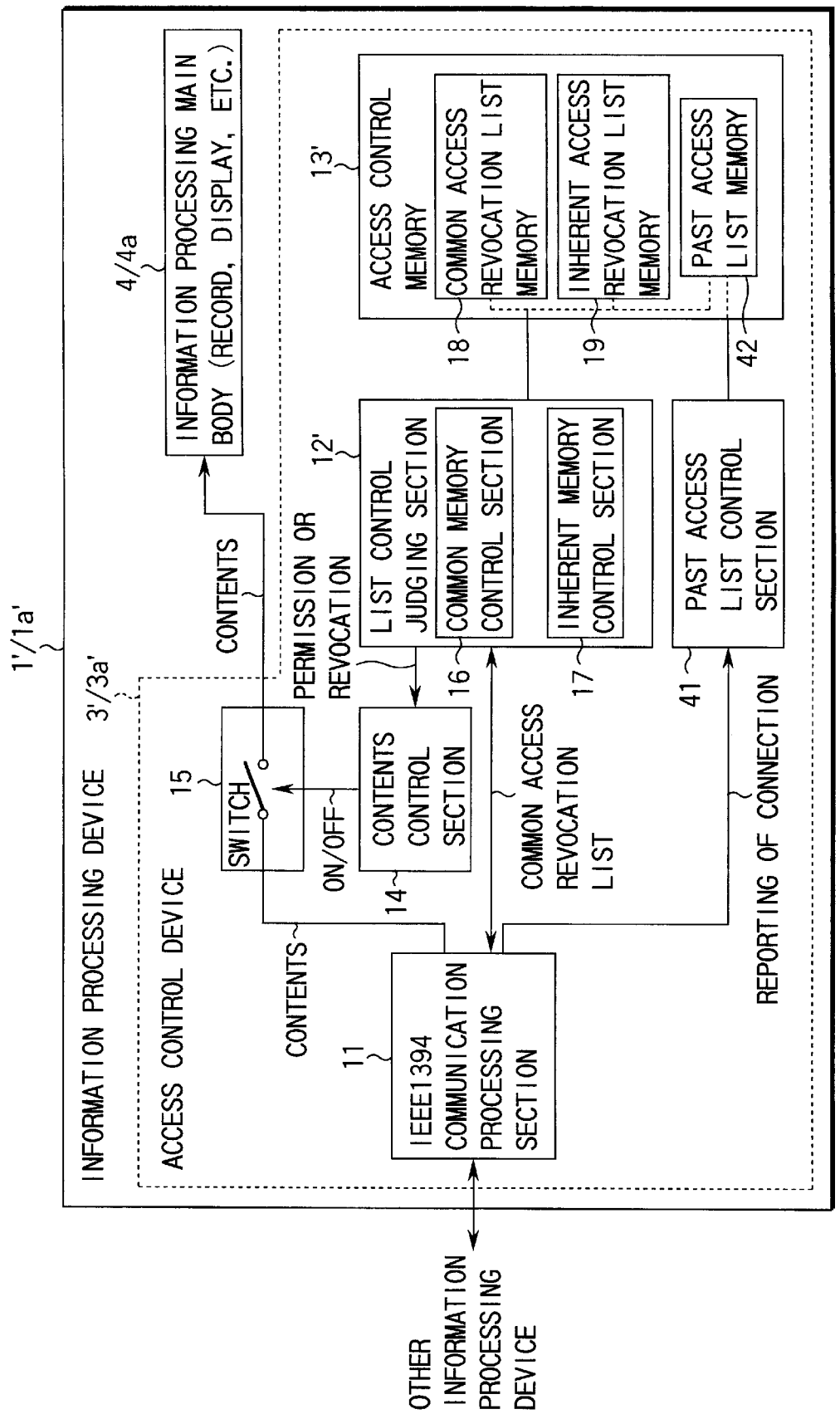
FIG. 8 is a block diagram illustrating an example of a structure in which an information processing device according to a second embodiment of the invention is used as a contents receiving device.

FIG. 8 is a block diagram illustrating a structure employed in a case where the information processing device of the second embodiment is a contents receiving device. In FIG. 8, elements similar to those in FIGS. 1–7 are denoted by corresponding reference numerals, and only different elements will be described.

As is shown in FIG. 8, an information processing device 1'/1a' according to the second embodiment is constructed in a similar manner to the first embodiment except that in the former, a past access list control section 41 and an access control memory 13' with a past access list memory 42 are provided in an access control unit 3'/3a', and also that the former employs an list control/determination section 12' having a modified function.

The past access list control section 41 adds identification information of another information processing device 1 in a past accessed device list stored in the past access list memory 42, when the control section 41 has been informed by the communication processing section 11 of a request for connection from said another device 1.

The past access list memory 42 stores the past accessed device list, which can also be read by the past access list control section 41. The past accessed device list is a list that stores identification information indicating any device by which or to which a request for connection was issued. Addition of identification information to this list is executed irrespective of whether access permission is performed.

The list control/determination section 12' performs similar operations to the section 12 employed in the first embodiment, and checks, when the common access revocation device list has been updated, whether or not the common access revocation device list stores any device that is registered in the past accessed device list. If there exists corresponding access control information, this information is stored in the inherent access revocation device list.

Where the information processing device is a contents receiving device, the aforementioned structural elements 41, 42 and 12' are added to a structure shown in FIG. 3. Further, where the information processing device is a contents transmitting/receiving device, a structure is used which is obtained by appropriately combining the structures of FIGS. 3 and 8.

The operation of the information processing device constructed as above will be described.

Figure 9:
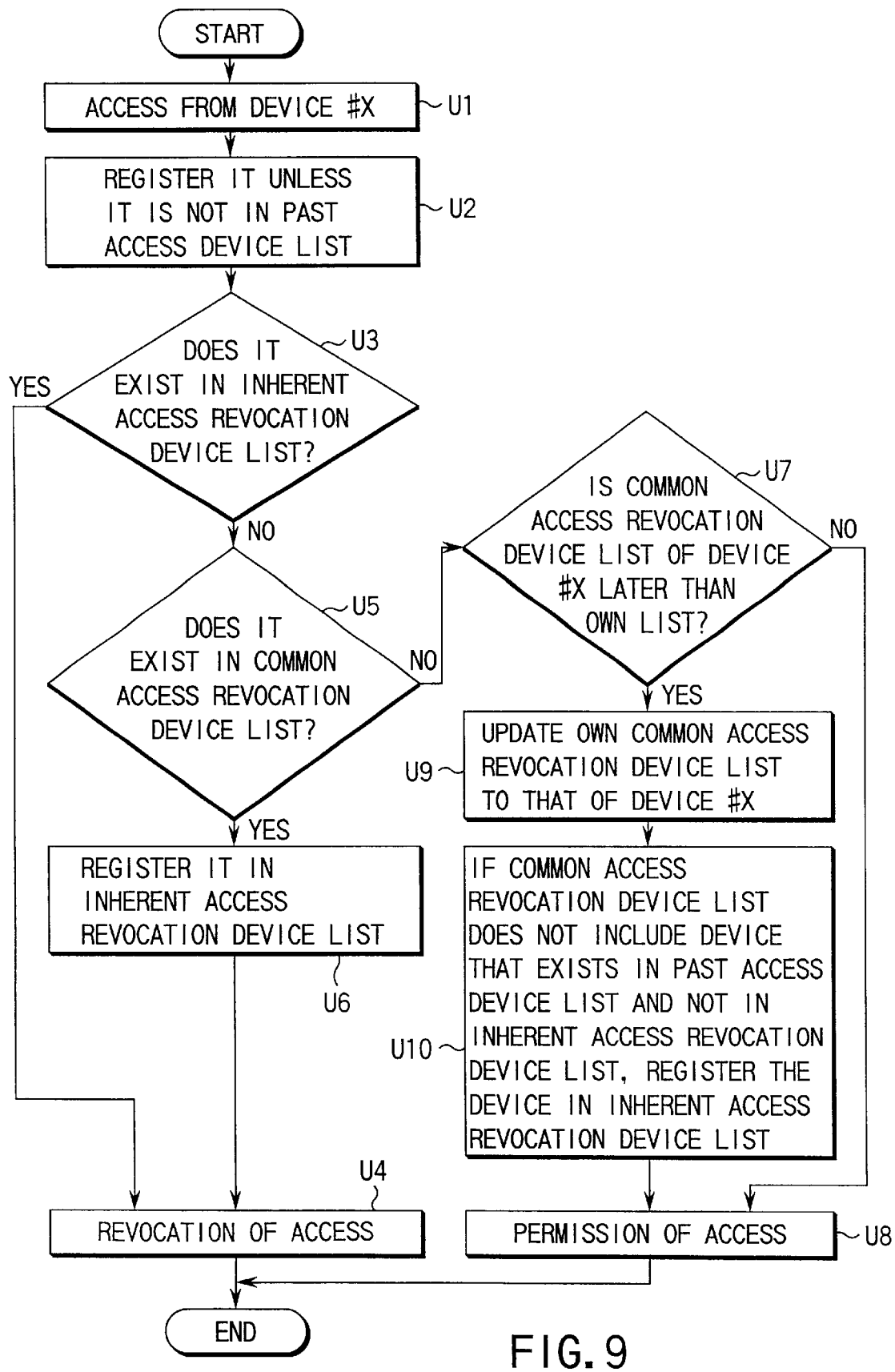
FIG. 9 is a flowchart useful in explaining processing performed between two information processing devices when a request for connection has been issued from one of the devices to the other or vice versa, until access by the one or by the other is permitted or rejected.

FIG. 9 is a flowchart for explaining the procedure of processing performed to execute access permission or revocation between an information processing device according to this embodiment and another information processing device that has requested or has been requested to be connected to the first-mentioned device. This flowchart mainly indicates the operation of the access control unit 3.

The processing of the first step U1 is similar to that of the step S1. If there is a request for connection from the device #X, its identification information is supplied from the communication processing section 11 to the past access list control section 41. If it is determined that the device #X is not put on the past accessed device list, its identification information is registered therein by the past access list control section 41 (step U2).

Steps U3 to U9 are similar to the steps S2 to S8.

When the device #X is a correct information processing device whose access is permissible and the contents of the memory 18 have been replaced with the common access revocation device list of the device #X at the step U9, it is considered that the common access revocation device list is updated.

Then, the list control/determination section 12' determines whether or not the updated common access revocation device list stores a device that is registered in the past accessed device list but not in the inherent access revocation device list. If there is such a device, its identification information is registered as access control information in the inherent access revocation device list (step U10).

Figures 10A, 10B:
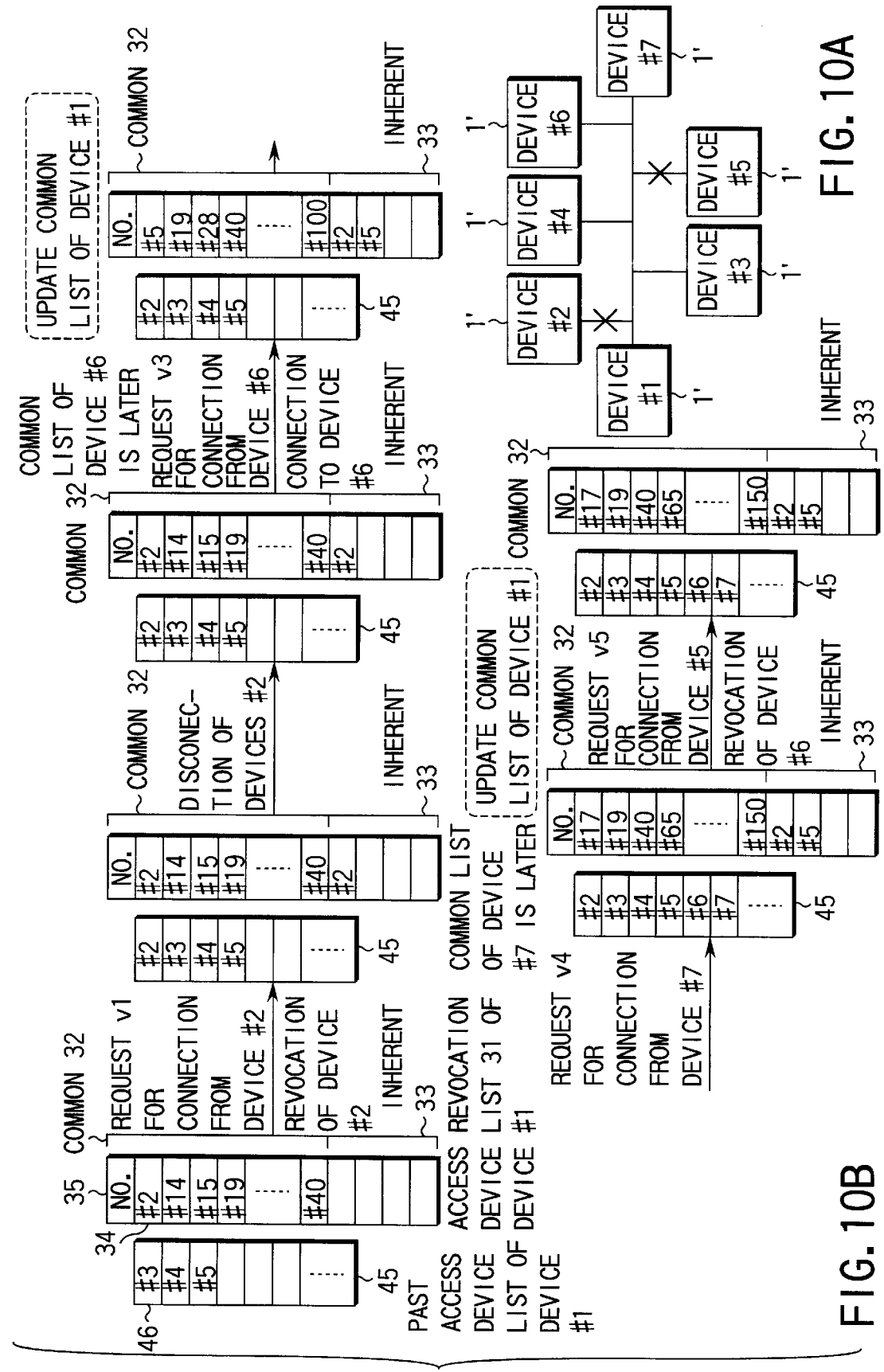
FIG. 10A is a view showing another system structure in which access control is executed.
FIG. 10B is a view of another example of the state in which the contents of an access revocation device list are changed when the access control is executed.

FIG. 10B shows an example of a state in which the contents of the access revocation device list change while the access control is executed.

In this case, information processing devices 1' (#1–#7) are connected as shown in FIG. 10A. FIG. 10B shows a past accessed device list 45 employed in the device #1, as well as the access revocation device list 31 of the device #1. The past accessed device list 45 stores identification information 46 concerning devices (information processing devices) which accessed to the device #1 in the past. No identification information 46 is stored in the list 45 at the initial state (for example, at the time of shipping) of each information processing device 1'. In the FIG. 10B state, the device #1 already accessed the devices #3, #4 and #5.

When in this state, the device #1 has received a request (v1) for connection from the device #2, it registers the identification information of the device #2 in the past accessed device list 45. Further, since the device #2 is put on the common access revocation device list 32, the access control information 34 of the device #2 is registered in the inherent access revocation device list of the device #1 in accordance with the processing of FIG. 9, and access by the device #2 is rejected.

Suppose that the devices #4 and #5 are disconnected from the system of FIG. 10A (v2). Also in this case, the contents of the past accessed device list 45 are kept unchanged.

When the device #1 has received a request (v3) for connection from the device #6, it registers the identification information of the device #6 in the past accessed device list 45. Further, if the common access revocation device list of the device #6 is determined to be the latest one as a result of comparison of new/old information, the contents of the common access revocation device list 32 of the device #1 is updated in accordance with the processing of FIG. 9.

Moreover, if the updated common access revocation device list stores a device that is registered in the past accessed device list 45 but not in the inherent access revocation device list 33, its identification information is registered as access control information 34 in the inherent access revocation device list 33, and access by the device #6 is permitted. In this case, the identification information of the device #5 is newly registered in the inherent access revocation device list 33.

When the device #1 has received a request (v4) for connection from the device #7, it registers the identification information of the device #7 in the past accessed device list 45. Since also in this case, the common access revocation device list of the device #7 is the latest one, the contents of the memory 18 are replaced with the common access revocation device list 32 of the device #7, and access by the device #7 is permitted.

The devices #4 and #5 are reconnected to the system.

When the device #1 has received a request (v5) for connection from the device #5 whose identification information is registered in the inherent access revocation device list 33 of the device #1, it rejects access by the device #5. This can be executed because the identification information registered in the past accessed device list 45 is also registered in the inherent access revocation device list 33 in accordance with the updating of the common access revocation device list at v3. It should be noted that the device #1 has not rejected the device #5 so far, and that the identification information of the device #5 is not included in the common access revocation device list 32 of the device #1 at the present stage of rejection (v5).

FIGS. 11A and 11B are views useful in explaining that any device that is once registered in the inherent access revocation device list is rejected even when the contents of the common access revocation device list have changed. FIG. 11A is a view similar to FIG. 10A, FIG. 11B shows the updated access revocation device list 31 and past accessed device list 45 which appear in FIG. 10B, and FIG. 11C shows changes in the common access revocation device list 32.

As is evident from descriptions concerning FIGS. 10A, 10B and 11A–11C, the inherent access revocation device list 33 and the past accessed device list 45 store different access control information between the information processing devices 1'. Further, since the identification information of a device that accessed another device at least once is registered in the past accessed device list 45 of the second device, it is registered in the inherent access revocation device list 33 of the second device on the basis of the contents of the lists 32 and 45, even if the first device is not presently connected to the second device.

Figure 12A:
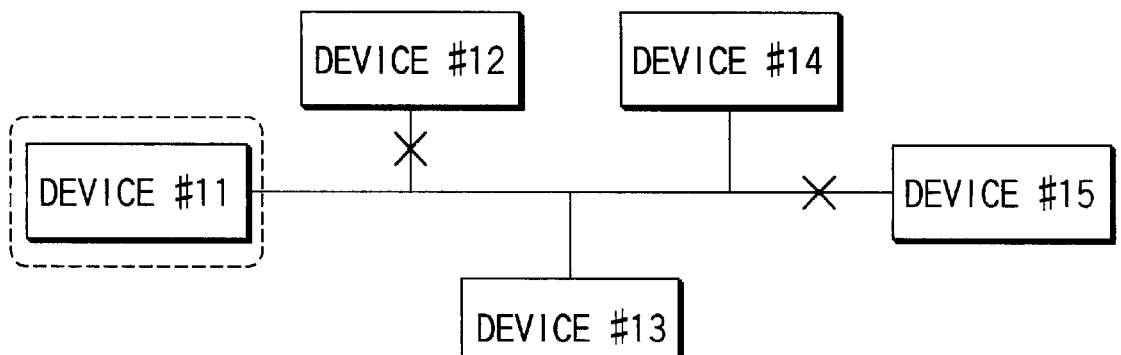
FIG. 12A is a view of another system structure, useful in explaining that any device registered in the inherent access revocation device list is rejected even when the contents of the common access revocation device list have been changed.
Figure 12B:
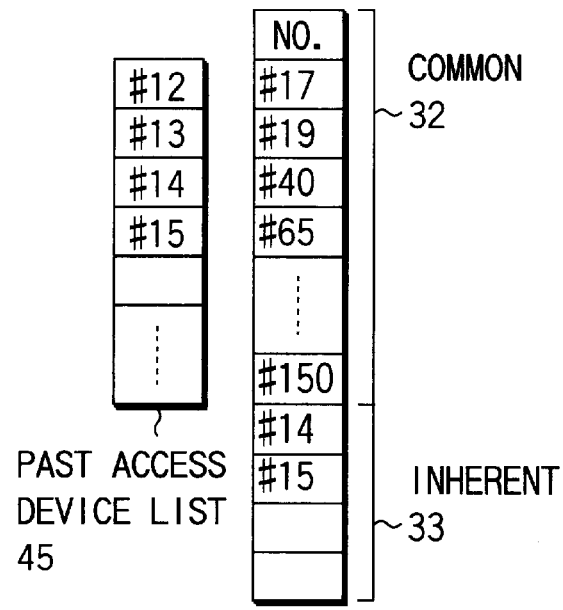
FIG. 12B is a view of other examples of the access common access revocation device list and the past accessed device list, useful in explaining that any device once registered in the inherent access revocation device list even when the contents of the common access revocation device list have been changed.

FIGS. 12A and 12B are views for explaining another case where access by any device that is once registered in the inherent access revocation device list is rejected even when the contents of the common access revocation device list have changed.

In this case, a device #11 was accessed by devices #12–#15 in the past. In particular, the identification information of the devices #14 and #15 is registered in the inherent access revocation device list 33 as a result of their access rejection or of the above-described processing even without access rejection. This access control information is not included in the present common access revocation device list 32 of the device #11.

As described above, the information processing device of the second embodiment employs the past accessed device list 45, and the identification information of a device that is registered in the list 45 and in the common access revocation device list 32 but not in the inherent access revocation device list 33 is added to the inherent list 33. Accordingly, future access by any wrong information processing device, which was connected to the device of the embodiment in the past and hence may be again connected thereto in the future, can be rejected irrespective of whether the contents of the common access revocation device list 32 are changed or whether access by the wrong device was rejected before.

In other words, access information concerning a device, which once accessed the device of the embodiment, is stored, in a second storage section, as information indicating that the first device may access the second one again in the future. Moreover, even when access information concerning the first device has been erased from access information that can be updated in common, access to the second device by the first device can be rejected effectively.

THIRD EMBODIMENT

In the first and second embodiments, the information processing devices of the invention are applied to an information communication system based on the IEEE1394. However, application of the devices is not limited to the system, but can be done to any system which performs communication of contents between information processing devices belonging thereto. In the third embodiment, a computer LAN system and a VOD system, to which the invention is applied, will be described.

First, the computer LAN system will be described.

Figure 13:
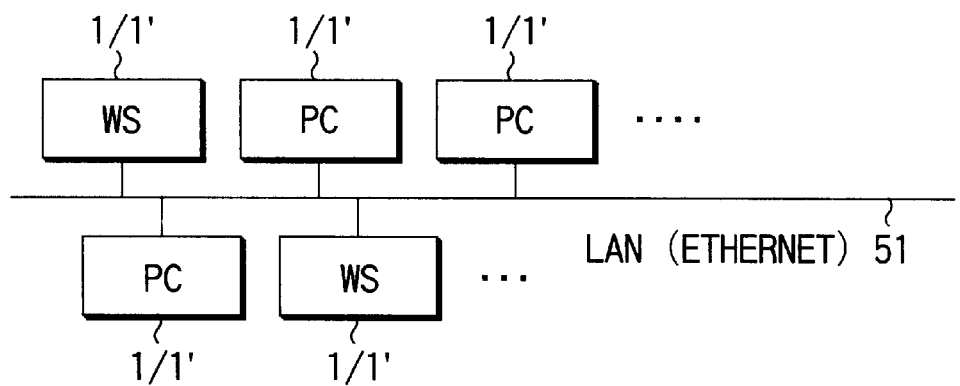
FIG. 13 is a block diagram illustrating an example of a system which employs an information processing device according to a third embodiment of the invention.

FIG. 13 is a block diagram showing an example of a system that incorporates information processing devices according to the third embodiment.

Specifically, FIG. 13 shows a network system which incorporates information processing devices 1 or 1', such as personal computers, work stations, etc., connected to each other by a LAN 51.

The information processing device 1 or 1' has the same structure as that of the first or second embodiment except that in the device 1 or 1', the main body of a so-called computer is used in place of the information processing main section 4, and a communication device such as a network card is used in place of the IEEE1394 communication processing section 11 in the access control unit 3 or 3'.

By virtue of the above structure, the system shown in FIG. 13 can provide the same advantage as the first or second embodiment.

Second, the VOD system will be described.

Figure 14:
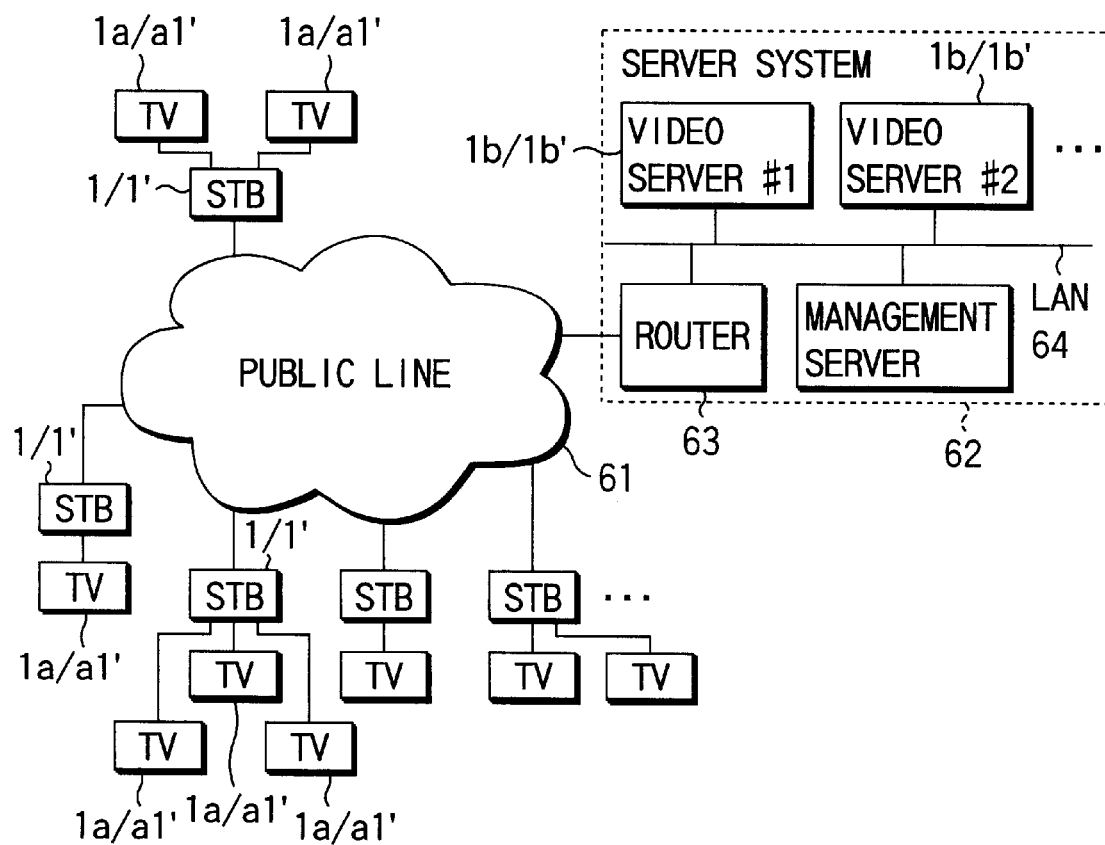
FIG. 14 is a block diagram illustrating another example of the system which employs the information processing device according to the third embodiment of the invention.

FIG. 14 is a block diagram showing another example of the system that incorporates information processing devices according to the third embodiment.

As is shown in the figure, in the VOD system, a server system 62 is connected to a public line 61 such as the Internet, multiple set top boxes STB as the information processing devices 1/1' are connected to the public line, and information processing devices 1a/1a' such as TVs are connected to the respective set top boxes STB.

The server system 62 includes a LAN 64 connected to the public line 61 via a router 63, and video servers and a management server as the information processing devices 1/1' connected to the LAN 64. Also in this system, means suitable for the communication method of the system is used in place of the IEEE1394 communication processing section 11, as in the first-mentioned example of the system.

This structure enables the system of FIG. 14 to provide the same advantage as the first or second embodiment.

The VOD system can employ a method for concentrically managing the access revocation device list by the management server, and transmitting the list before transmitting contents from each video server, thereby enabling each set top box to limit, using the list, access to a device, such as a TV, connected thereto.

The invention is not limited to the above-described embodiments, but can be modified in various manners without departing from its scope.

For example, the common and inherent access revocation device lists may be stored in a single memory device instead of respective memory devices. In this case, it suffices if the memory areas or means corresponding to the lists can be discriminated as shown in FIG. 2, 3 or 8.

Further, although in the embodiments, the entire common access revocation device list is stored in the access control information memory 18, it may be divided into a plurality of common access revocation device lists that comprise, for example, a first common access revocation device list, a second common access revocation device list, . . . . In this case, at least one of the lists may be updated on the basis of new/old information so as to provide the latest lists.

Furthermore, the common access revocation device list may be stored in the memory 18 in the form of a predetermined number of access control information items, not in the form of a list. In this case, new/old information may be added to each access control information item, thereby updating the access control information items so as to form a predetermined number of latest access control information items.

In addition, in each embodiment, the common memory control sections 16 and 17 control the common access revocation list memory 18 and the inherent access revocation list memory 19, respectively. However, a single memory control section may control all the memory devices 18, 19 and 42.

Although in the first and second embodiments, communication between information processing devices is based on the IEEE1394 standards, the invention is not limited to these standards. Various communication methods such as broadcast communication using radio waves, communication using a cable TV system, network communication using the Internet, etc. can be used. The present invention performs access control in accordance with the type of communication.

Further, although in each embodiment, access control is performed using the access revocation device list for access revocation, the invention is not limited to access control in the form of "access revocation". For example, access control may be performed so as to find out devices access by which is permissible, using an access permission list (common and inherent access permission lists). A list including both access permission information and access revocation information may be used. Thus, the idea of the present invention is widely applicable to "access control" in general.

The devices according to the embodiments can be realized by loading a computer with programs stored in a recording medium. Recording mediums that provide contents can be used, as well as program-providing ones. In this case, a common access revocation device list is stored therein as described in the embodiments.

The above recording mediums are specifically magnetic disks, floppy disks, hard disks, optical disks (CD-ROM, CD-R, DVD, etc.), photomagnetic disks (for example, MO), semiconductor memory devices, etc. In other words, it suffices if the recording mediums can store programs, data, etc. and can be read by a computer, and they may employ any recording methods.

Moreover, part of each processing for realizing the embodiments may be executed by an OS (Operation System) that operates on the basis of programs installed from a recording medium into the computer, or MW (middleware software) such as data base management software, network software, etc.

In addition, the recording medium used in the invention is not limited to a medium independent of the computer, but may be a medium obtained by downloading and storing (or temporarily storing) a program transmitted via a LAN, the Internet, etc.

The invention may use a plurality of recording mediums in place of a single medium, and may employ any medium structure.

Further, it suffices if the computer used in the invention performs each processing included in the embodiments, on the basis of programs stored in the recording medium, and the invention may consist of a single personal computer or a system including a plurality of computers connected to each other via a network.

The computer used in the invention is not limited to a personal computer, but may be an arithmetic processing unit included in a digital information apparatus such as a DVD player, or a microcomputer. In other words, the computer used in the invention is a generic name for an instrument or a device that can realize the functions of the invention, using programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing device with an access control function comprising:
   a first storage section which stores a list of at least one item of access information item indicating an information processing device to be revoked;
   a second storage section which stores at least one item of the access information which was stored at least once in the past or is stored at present in the first storage section;
   a determination section which determines whether access by another information processing device is permissible or should be rejected, on the basis of the access information stored in the first or second storage section;
   an access control section which controls said another information processing device on the basis of a determination result of the determination section;
   an access information updating section which replaces the list stored in the first storage device with a new list when the new list stored in and supplied from the another information processing device is newer than the list stored in the first storage device;
   a past-accessed object storage section storing, irrespective of a determination result of the determination section, identification information indicating another information processing device access to which or access by which was requested;
   an access information adding section for additionally registering, in the second storage section, the access information stored in the first storage section when an accessed object indicated by the identification information stored in the past-accessed object storage section is identical to an accessed object indicated by the access information stored in the first storage section;
   wherein the first storage section stores at least one item of access information that can be updated; and
   an access information registering section which registers, in the second storage section, that one item of the access information stored in the first storage section, which is the access information concerning said another information processing device used in the determination section for determining whether access is permissible or should be rejected.

2. A device according to claim 1, wherein the access information updating section is further capable of replacing part or the entire portion of said at least one access information item with at least one new access information item, when it has received the at least one new access information item.

3. A device according to claim 1,
   wherein the list in the first storage section contains new/old information as well as the at least one access information item,
   and further comprising a list transmitting section for transmitting the list stored in the first storage section to another information processing device, when the device has accessed said another information processing device.

4. A device according to claim 1,
   wherein the list in the first storage section contains new/old information as well as the at least one access information item;
   and wherein the access information updating section compares when it has received a new list that includes at least one access information item and new/old information from accessed another information processing device, the new/old information included in the list stored in the first storage section with the new/old information included in the received new list, and replaces contents of the first storage section with the received new list if the received new list is more recent than the list in the first storage section.

5. A computer program stored in a computer readable medium, comprising:
   a code of first storage control means, in a first storage section, which stores a list of at least one item of access information indicating an information processing device to be revoked;
   a code of second storage control means, in a second storage section, which stores at least one item of the access information, which was stored at least once in the past or is stored at present in the first storage section;
   a code of determination means which determines whether access by another information processing device is permissible or should be rejected, on the basis of the access information stored in the first or second storage section;
   a code of access control means which controls said another information processing device on the basis of a determination result of the determination section;
   the code for the first storage control means replaces the list stored in the first storage device with a new list when the new list stored in and supplied from the another information processing device is newer than the list stored in the first storage device;
   a code of past-accessed object storage control means for storing identification information indicating another information processing device access to which or access by which was requested, in a past-accessed object storage section irrespective of a determination result of the determination section;

wherein the second storage control means stores, in the second storage section, the access information stored in the first storage section when an accessed object indicated by the identification information stored in the past-accessed object storage section is identical to an accessed object indicated by the access information stored in the first storage section;

wherein the first storage section stores at least one item of access information that can be updated; and wherein the second storage control means registers, in the second storage section, that one item of the access information stored in the first storage section, which is the access information concerning said another information processing device used in the determination section for determining whether access is permissible or should be rejected.

6. A computer program according to claim 5, wherein the first storage control means is capable of replacing part or the entire portion of said at least one access information item which is stored in the first storage section with at least one new access information item, when the first storage control means has received the at least one new access information item.

7. A computer program according to claim 5, wherein the list in the first storage section contains new/old information as well as the at least one access information item, and further comprising a code of list transmitting means for transmitting the list stored in the first storage section to another information processing device, when the device has accessed said another information processing device.

8. A computer program according to claim 5, wherein the list in the first storage section contains new/old information as well as the at least one access information item, the first storage control means comparing, when it has received a new list that includes at least one access information item and new/old information from accessed another information processing device, the new/old information included in the list stored in the first storage section with the new/old information included in the received new list, and replacing contents of the first storage section with the received new list if the received new list is more recent than the list in the first storage section.

* * * * *